(12) United States Patent
Sterling et al.

(10) Patent No.: US 10,676,901 B2
(45) Date of Patent: Jun. 9, 2020

(54) INTERACTIVE WATER MONITORING SYSTEM

(71) Applicant: Water Hero, LLC, Beverly, MA (US)

(72) Inventors: Daniel Sterling, Palm Beach Gardens, FL (US); Alex Cheimets, Arlington, MA (US)

(73) Assignee: Water Hero LLC, Beverly, MA (US)

( * ) Notice: Subject to any disclaimer, the term of this patent is extended or adjusted under 35 U.S.C. 154(b) by 224 days.

(21) Appl. No.: 15/523,697

(22) PCT Filed: Nov. 12, 2015

(86) PCT No.: PCT/US2015/060249
§ 371 (c)(1),
(2) Date: May 2, 2017

(87) PCT Pub. No.: WO2016/077509
PCT Pub. Date: May 19, 2016

(65) Prior Publication Data
US 2017/0335550 A1 Nov. 23, 2017

Related U.S. Application Data

(60) Provisional application No. 62/079,525, filed on Nov. 13, 2014.

(51) Int. Cl.
*E03B 7/07* (2006.01)
*G01M 3/28* (2006.01)
*G01F 1/00* (2006.01)

(52) U.S. Cl.
CPC ........... *E03B 7/072* (2013.01); *G01M 3/2807* (2013.01); *G01F 1/00* (2013.01)

(58) Field of Classification Search
CPC ......... E03B 7/072; G01M 3/2807; G01F 1/00
USPC .......................................................... 73/201
See application file for complete search history.

(56) References Cited

U.S. PATENT DOCUMENTS

| | | | | |
|---|---|---|---|---|
| 5,409,037 A | * | 4/1995 | Wheeler | G01M 3/243 137/487.5 |
| 5,974,862 A | * | 11/1999 | Lander | G01M 3/243 702/51 |
| 6,065,735 A | * | 5/2000 | Clark | F01L 13/0005 251/129.03 |

(Continued)

*Primary Examiner* — Natalie Huls
*Assistant Examiner* — Monica S Young
(74) *Attorney, Agent, or Firm* — Law Offices of Daniel A. Tesler, LLC (57) ABSTRACT

An exemplary system for an interactive water supply management system for use in residential and commercial properties and a method of installation and use are provided. In the preferred embodiment is a system comprising a water consumption sensor capable of being externally mounted to a water meter, circuitry for the collection of water consumption data, a communication system allowing two way communication with a user and a water main valve shutoff. Remote vibration sensors on water pipes or acceleration sensors on manually articulated water valves provide feedback to the system to allow automatic identification of water consumed by each faucet or appliance. The communication system includes a means of two way communication through the manipulation of the water flow rate by the water shut off valve or by a user.

15 Claims, 11 Drawing Sheets

(56) References Cited

U.S. PATENT DOCUMENTS

| | | | | |
|---|---|---|---|---|
| 6,662,821 B2* | 12/2003 | Jacobsen | F16K 31/05 | 137/2 |
| 7,066,192 B1* | 6/2006 | Delaney | F16K 31/055 | 137/15.18 |
| 7,810,378 B2* | 10/2010 | Hunaidi | G01M 3/243 | 73/40.5 A |
| 2007/0095400 A1* | 5/2007 | Bergquist | F16K 7/14 | 137/485 |
| 2010/0064776 A1* | 3/2010 | Getto | G01F 1/7088 | 73/40.5 R |
| 2010/0295672 A1* | 11/2010 | Hyland | H04Q 9/00 | 340/539.1 |
| 2010/0313958 A1* | 12/2010 | Patel | E03B 7/071 | 137/1 |
| 2011/0035063 A1* | 2/2011 | Palayur | G01F 15/063 | 700/283 |
| 2011/0320140 A1* | 12/2011 | Butler | G01F 15/063 | 702/45 |
| 2013/0183958 A1* | 7/2013 | Wesby | G06Q 40/00 | 455/420 |
| 2014/0230925 A1* | 8/2014 | Halimi | G05D 16/20 | 137/487.5 |
| 2014/0245208 A1* | 8/2014 | Javey | H04Q 9/00 | 715/771 |
| 2015/0013772 A1* | 1/2015 | Patel | F16K 31/12 | 137/1 |
| 2016/0252422 A1* | 9/2016 | Howitt | E03B 7/071 | 73/40.5 A |
| 2017/0030798 A1* | 2/2017 | DeVerse | G06F 19/00 | |
| 2017/0285665 A1* | 10/2017 | Nunally | E03B 7/071 | |
| 2017/0307466 A1* | 10/2017 | Brennan, Jr. | G01F 1/66 | |
| 2018/0230681 A1* | 8/2018 | Poojary | G01F 15/063 | |
| 2018/0347157 A1* | 12/2018 | Brotherton | E03L 37/078 | |

* cited by examiner

INTERACTIVE WATER MONITORING SYSTEM

CROSS REFERENCE TO RELATED APPLICATIONS

This application claims the benefit of U.S. Provisional Patent Application No. 62/079,525 filed Nov. 13, 2014, which is hereby incorporated by reference in its entirety.

FIELD OF THE INVENTION

The present invention relates to the collection of water usage data and water system management.

BACKGROUND OF THE INVENTION

Over the years, various products have been devised for collecting water consumption data for a residential or commercial property. These products, however, have been focused on the passive collection of data for subsequent analysis rather than active management of the water supply system. In addition, there is a need for a system that is capable of automatically identifying the amount of water used by each fixture or appliance on a plumbing system without requiring a user to manually identify each water consumption event.

The most common method in use today for determining the volume of water consumed by a property is a water meter. While water meters provide an accurate assessment of the amount of water consumed over a period of time (e.g. a billing period), they do not provide detailed or real-time water consumption data.

There are multiple devices in the prior art that use a water meter as a platform for collecting water usage data. Devices can be attached to a water meter housing or integrated into a water meter register to measure the volume of water passing through the water meter through the use of magnetic sensors. By coupling the magnetic sensors to an electronic data collection system, devices in the prior art are capable of providing detailed water consumption data, but are unable to automatically identify the amount of water used by a specific fixture or appliance or allow a user to actively manage and interact with the water management system.

The present invention provides an interactive water supply management system for use in residential and commercial properties. The present invention provides a water consumption sensor capable of being externally mounted to a water meter and calibrated to the specific water meter's characteristics, circuitry for the collection of water consumption data, a communication system allowing interaction between the user and the water management system and a water valve shutoff capable of being mounted to an existing household water valve and capable of being controlled by the water management system. Additional sensors may optionally be added to the water management system to record and react to data collected by additional sensors, including but not limited to, temperature, humidity, combustible gases and moisture.

Accordingly, it is an object of the present invention to provide an interactive water management system designed to be used in residential and commercial properties.

BRIEF SUMMARY OF THE INVENTION

The present invention is an interactive water management system comprising a controller, at least one sensor capable of recording the volume of water passing through a pipe over a period of time, at least one apparatus capable of converting a manually activated water valve to a valve capable of being controlled remotely, and a communication system between the controller and the user. The present invention may optionally include additional sensors, additional water valve actuators and multiple modes of communication between the user and the controller. The present invention may optionally substitute the apparatus for converting a manually activated water valve to a valve capable of being controlled remotely with a motorized valve assembly capable of being controlled remotely. While the invention described has been described as being particularly applicable to residential and commercial properties, it is appreciated that the present invention could be used in other applications within the scope of the inventive concept.

DETAILED DESCRIPTION OF THE INVENTION

Figure 1:
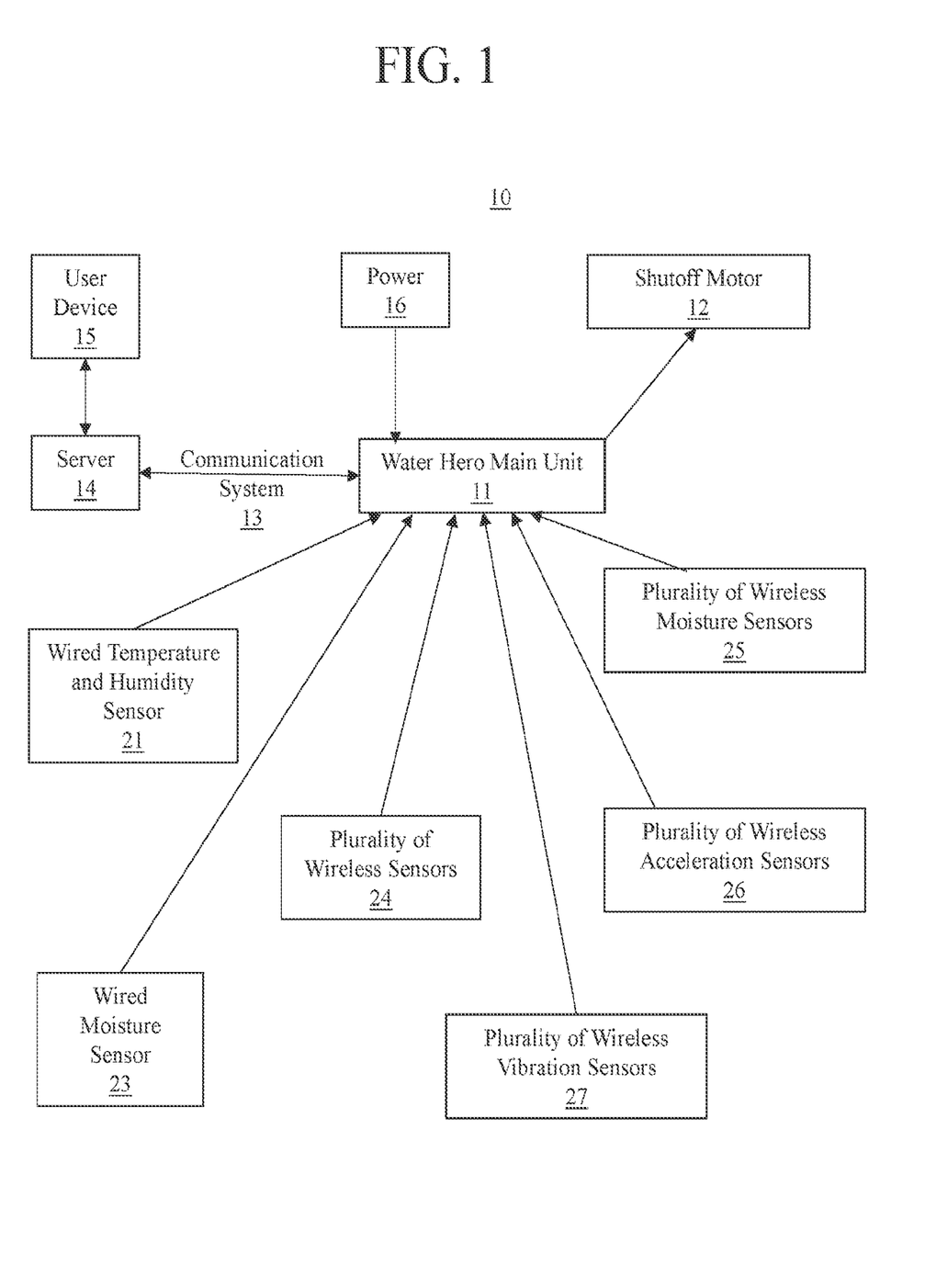
FIG. 1 is a block diagram of a first embodiment of the invention.
Figure 2:
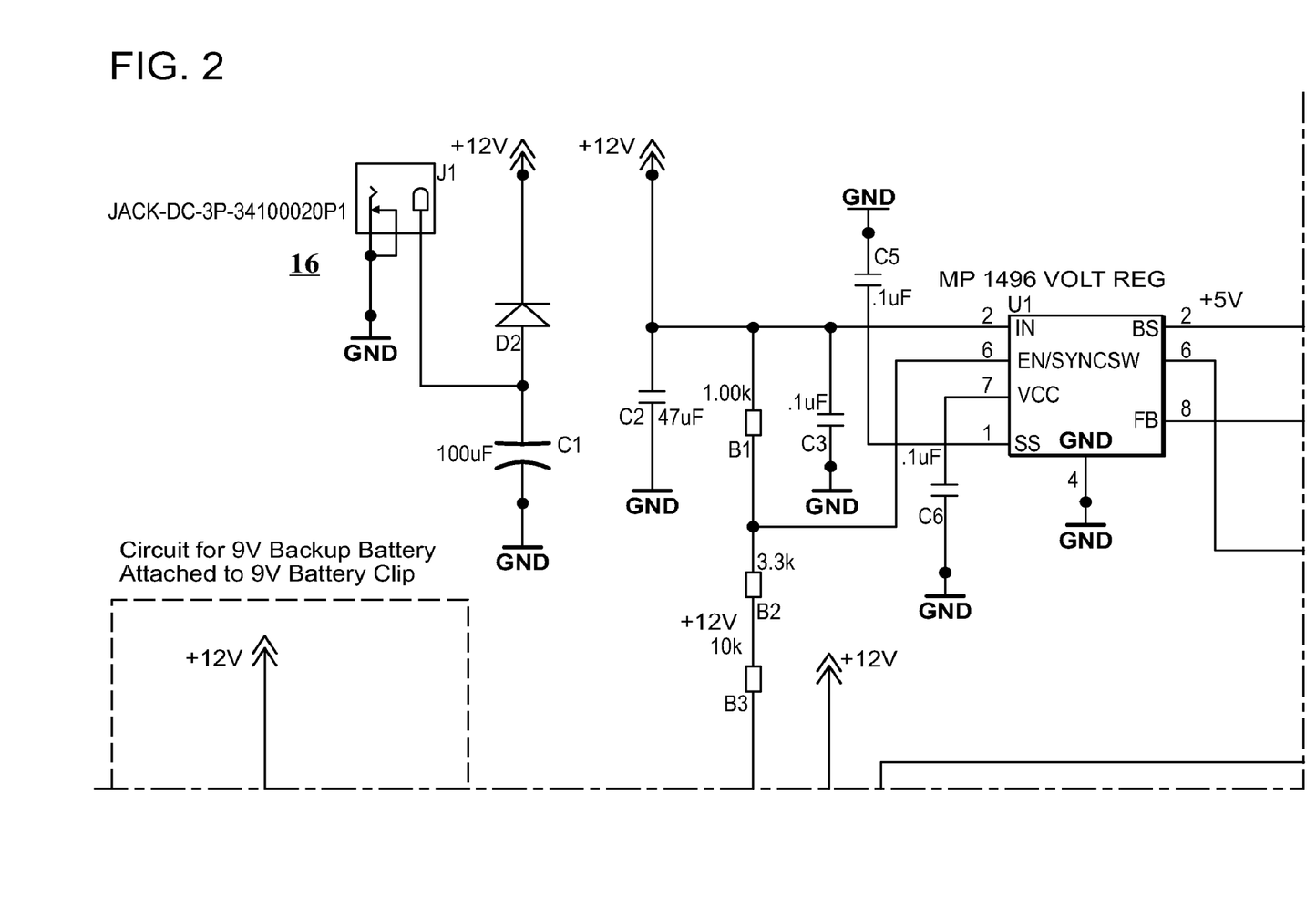
FIG. 2 is an exemplary circuit diagram of the main unit and controller of the first embodiment of the invention.

As seen in FIG. 1 is a first embodiment of a water management system 10 comprising a main unit 11 attached to the housing of a conventional water meter, an electric water valve shutoff motor 12 attached to a conventional water main valve and a communication system 13 that allows multiple modes of two-way communication with a user. FIG. 2 is an exemplary circuit diagram of the main unit 11. The main unit 11 normally receives power through a household wall adapter 16 but also contains one or more batteries 17 as a backup power source.

The main unit 11 is attached to the case of a water meter and contains a magnetometer to detect the change in magnetic field in the water meter when water is flowing through the meter. The majority of water meters used in commercial and residential applications contain nutating or rotating disks with attached magnets to drive the register. When water flows such a meter, the water causes the disks to nutate or rotate. The nutation or rotation of the disks with attached magnets cause a change in the magnetic field in the water meter which is detected by the magnetometer in the present invention. In the preferred embodiment, the main unit 11 is attached to the side of the water meter housing.

Included in the main unit 11 is a microprocessor unit (MPU) 31 that serves as the system controller and is capable of two way-communication with a user. The MPU 31 receives the digital reading from the magnetometer and relays the water usage data to the user through the communication network 13. The MPU 31 also communicates with the shutoff motor 12 to open or close the water main valve.

In the preferred embodiment, the main unit 11 has a wired connection to the shutoff motor 12 through the shutoff motor jack 32 to provide a means for communication and to provide power to the shutoff motor 12. The connection between the main unit 11 and shutoff motor 12 can optionally be wireless and the shutoff motor 12 can optionally use an independent power source.

In the preferred embodiment, the MPU 31 contains expansion ports for the addition of a temperature and humidity sensor 21, a moisture sensor 23 and/or additional sensors. In the main unit 11, the temperature and humidity sensor 21 connects to connector 33 and moisture sensor 23 connects to connector 34. Connector 35 is for future expansion to connect additional sensors. The MPU 31 uses a wireless receiver 36 to communicate with a plurality of additional wireless sensors 24. It is understood that multiple methods of wired and wireless communication are available in the art and appropriate for this application. Among the available wireless communication methods, Bluetooth and other low energy systems using 900 MHz or 432 MHz frequency, Zigbee or Z-Wave transmissions are particularly suitable for the present invention. Among the available wired communication methods available, an Ethernet connection would be suitable for the present invention. A plurality of wireless sensors 24 may be optionally added to the system which include, but are not limited to, sensors to record temperature, humidity, carbon monoxide, combustible gases and radon at various locations in the home. Additional wireless moisture sensors 25 may also be optionally added to the system and placed in areas that are prone to water leaks. Areas prone to water leaks include, but are not limited to, water heaters, washing machines, dishwashers and pipes at risk of freezing. A wireless moisture sensor 25 may also be placed near a sump pump to detect a malfunction.

The MPU 31 is also in wireless communication with a plurality of acceleration sensors 26 and vibration sensors 27 to identify the fixture or appliance responsible for each water consumption event. Acceleration sensors 26 are placed on activation switches or levers for water consuming devices. For example, an acceleration sensor 26 may be placed on a toilet flush handle or a water faucet handle. When faucets or appliances with acceleration sensors 26 are turned on or shut off, the movement of the acceleration sensor 26 sends a signal to the MPU 31. Through pattern matching using the time between the signals from the acceleration sensor and the amount of water flow detected by the main unit during that time period, the system 10 can identify the amount of water used by the specific faucet or appliance.

For appliances that consume water automatically or where the use of an acceleration sensor 26 is impractical, vibration sensors 27 may be placed on the water supply pipe, downstream from the water meter, leading to a particular appliance to detect when the water is turned on and shut off on that branch. When a water valve is opened or closed, it generally sends a vibration through the supply pipe. The vibration sensors 27 record the time of each vibration and send a signal to the MPU 31 indicating when a valve supplied by that pipe is opened or closed. Similar to the use of the acceleration sensors 26, by correlating the time between the signals from the vibration sensors 27 and the amount of water flow detected by the main unit 11 during that period through pattern matching or other computing processes, the system 10 can identify the amount of water used by a specific faucet or appliance. In applications where either an acceleration sensor 26 or vibration sensor 27 may be used, both sensors may be optionally installed to generate additional data points for additional accuracy.

The identification function carried out by the vibration sensors 27 or acceleration sensors 26 can optionally be substituted with a remote ultra-sonic transmitter mounted on each fixture or appliance. The transmitters would mount at the exit of a faucet or water supply line for an appliance and create a sound when water passes through it. A variety of methods can be used to generate a sound in the water flow through the use of baffles or other small constrictions to flow. The transmitters would preferably generate the sound using the water flow itself rather than an outside power source. Sound is capable of traveling through pipes, creating a conduit for the sound produced by the transmitters. When using ultra-sonic transmitters, the main unit 11 would have a means for sensing the individual sounds produced by each transmitter to allow it to differentiate between each faucet or appliance when turned on.

The shutoff motor 12 comprises an electric actuator or motor mounted to the exterior of a water valve capable of being controlled by the MPU 31. The MPU 31 directs the shutoff motor 12 to open or close its associated valve based on preset flow rate and time values or based on user input. For applications using a ball valve, the shutoff motor 12 can use a direct drive motor that mounts over the handle of the water valve and providing the 90 degrees of movement appropriate for opening and closing a ball valve.

In applications requiring more than a single turn of a handle for opening and closing the valve, such as globe valves, stop valves and gate valves, the shutoff motor 12 can alternatively use a motor programmed for its specific operation. One possible motor that could be used in this application is an electric stepper motor, however, it is appreciated that other types of motors in the art would also be suitable. In operation, the user would program the motor by determining the number of turns of the handle that are necessary to fully open the water valve from a closed position. Using the number of turns needed for the full articulation of the valve, the MPU 31 can direct the motor to rotate for the appropriate number of degrees to open or close the valve. Alternatively, the shutoff motor 12 can be controlled through current sensing rather than preprogramming the number of turns required to operate the valve. When the shutoff motor 12 attempts to close an already closed valve or open an already open valve, it will be stopped by the mechanical stops in the valve itself, causing the electrical current to the motor to increase. The increase in current to the shutoff motor 12 can be used to determine when the valve is fully open or closed.

The shutoff motor 12 can optionally be substituted with a remotely controlled valve where the valve and motor are mounted and manufactured in a single unit.

The main unit 11 communicates with the user through the communication system 13. The communication system 13 comprises a wireless communication system and a water communication system. The wireless communication can employ a variety of communication networks known in the art, such as a wifi connection to an internet router, a radio transmitter or a cellular telephone network. In the preferred embodiment, the wireless communication system uses a router based connection to a web or cloud based server 14. A web or a cloud based server is a remotely located computing and communication unit that is capable of interaction with the main unit 11. The MPU 31 connects to the household network through a wifi connection and accesses the internet to allow communication between the MPU 31 and the server 14. The MPU 31 can alternatively access the internet through a wired connection to a router or modem.

The server 14 stores water usage and other data collected by the MPU 31 and provides an interface allowing a user to access the data and allows the user to communicate with the MPU 31. The user can communicate with the server 14 using an internet capable user device 15 such as a smart phone, tablet or computer or using a touch tone phone. The cloud account also allows users to select the default response preferences or set custom response preferences to direct the server 14 to send a text, email or automated phone call to a user when the data collected by the MPU 31 exceeds a preset parameter. It is also contemplated that the MPU 31 may communicate with other home security, automation or data collection systems.

The water communication system uses the flow rate of water through the water meter as a medium for two way communication between the MPU 31 and the user. The MPU 31 can communicate to the user by directing the shutoff motor 12 to shut off the water main for a preset amount of time to communicate an alert to the user. For example, to alert the user that an excessive amount of water is being consumed, the MPU 31 could direct the shutoff motor 12 to shut off the water for 3 seconds and then turn the water back on. This interruption in water flow would be seen by the user if he or she was presently using water. To avoid shutting off the water supply during an inconvenient time, such as a shower, the MPU 31 could be programmed to turn the water on after a water communication system alert for a preset amount of time, such as one minute, prior to shutting off the water indefinitely.

Instead of fully shutting off the water main, the water flow could alternatively be partially restricted by the shutoff motor 12 to a level of flow below the maximum flow rate for an open water main valve and above a flow rate of zero to communicate an alert to the user. For example, to alert the user that an excessive amount of water is being consumed, the MPU 31 could direct the shutoff motor 12 to reduce water flow to 50%. This reduction in water flow would be seen by the user if he or she was presently using water.

The water communication also provides a method of communication from the user to the MPU 31 through the flow rate of water through the water meter. The magnetometer in the main unit 11 is highly sensitive to even small amounts of water flowing through the water meter. To communicate with the MPU 31, the user can initiate a sequence of water flow starts and stops that are read by the magnetometer. For instance, to override a high water usage warning from the MPU 31, a user could initiate a preset sequence of turning a faucet on and off three times in one second increments (on for one second, off for one second, on for one second, off for one second, on for one second, then off). The specific flow pattern would be read by the magnetometer and communicated to the MPU 31.

The system 10 can optionally include a circuit for controlling a heating system to maintaining a minimum temperature in cold climates. Water pipes are susceptible to damage in cold climates if the water in the pipes is not kept above freezing. Most homes in colder climates use an installed heating system to maintain the house at a temperature that keeps the pipes from freezing. The system 10 can optionally include exterior temperature sensors, interior temperature sensors and internet based access to weather forecasts to control a heating system to keep the pipes from freezing.

Figure 3:
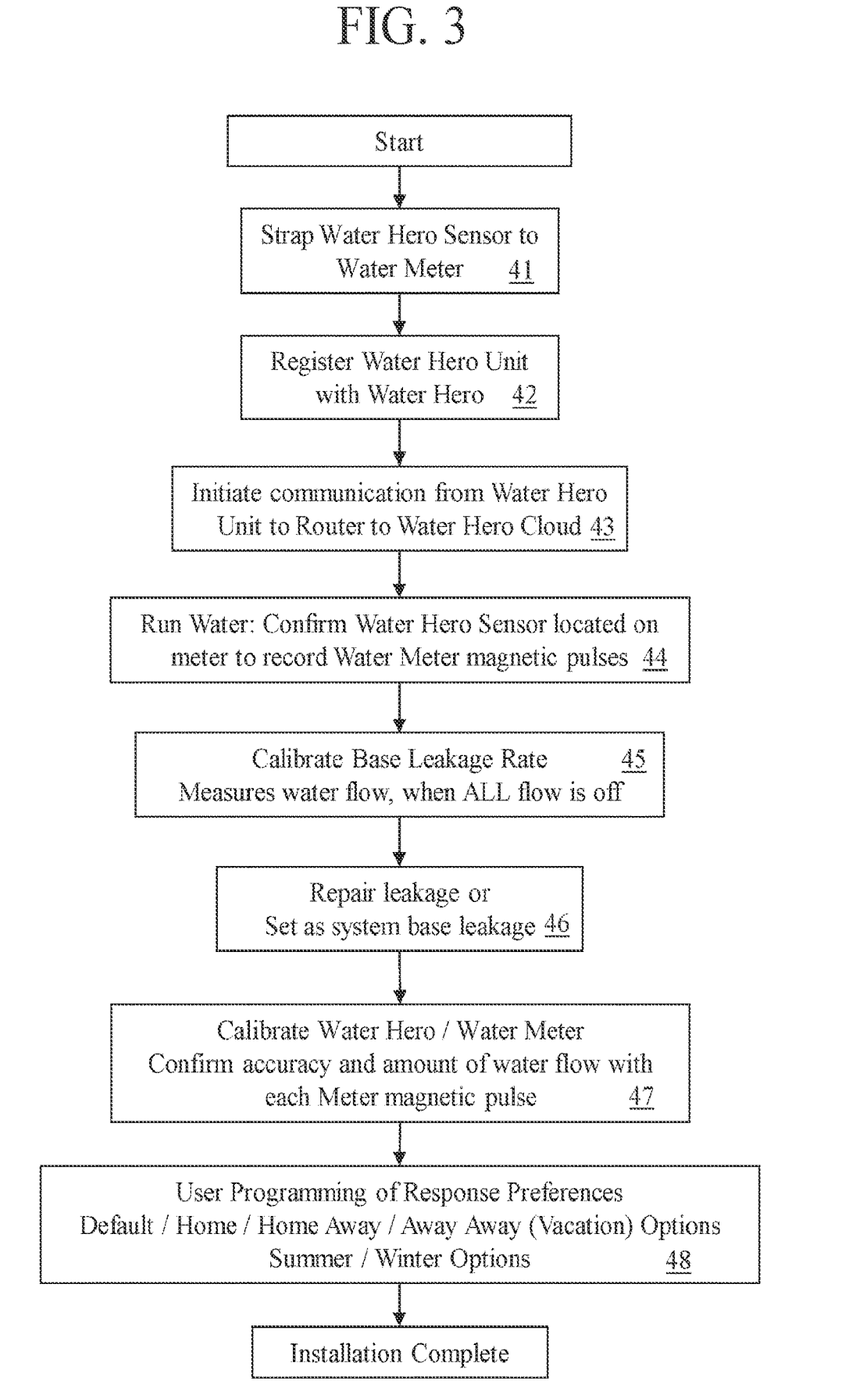
FIG. 3 is a flow chart for the installation of the first embodiment of the invention.

In FIG. 3 is flow chart detailing a method of installing the water management system 10. The first step 41 in the installation sequence is to strap the main unit 11 (also referred to as the Water Hero Sensor or Unit) to the water meter. The main unit 11 should be mounted to the side of the water meter to be capable of sensing the change in magnetic field when the internal magnets in the water meter nutate or rotate.

For the main unit 11 to interact with the cloud based server 14, the user must complete the registration step 42. The user registers the main unit 11 with the server 14 using an identifier unique to each main unit 11. The registration can occur either through a website hosted on the server 14, a phone call to a representative with access to the server 14 or through a retail location with access to the server 14. The registration process may also ask additional information about the location where the water management system 10 is being used, such as the geographic location, a characterization of the water usage (residential house, residential condo, commercial, etc.) and other questions that could be factored into the alert algorithms.

Once the registration step 42 is complete, the user must initiate communication 43 from the main unit 11 to the server 14. This step is typically accomplished by establishing a connection from the MPU 31 to an internet router. With a connection established, the main unit 11 must be tested 44 to ensure that the magnetometers are positioned to read the magnetic pulses from the water meter register. To test the main unit 11, the user must run the water in the system so that water flows through the water meter. With the water flowing, the user can confirm that the main unit 11 is recording the magnetic pulses from the water meter.

The base leakage rate must then be determined 45 to ensure that water usage is being accurately attributed to either actual consumption or system leaks. The base leakage rate is the flow rate of the system with all known faucets and water consuming devices turned off. The base leakage rate is an important value needed to determine whether water flowing through the meter is constant or intermittent. Many homes leak a certain amount of water even with all known water consuming devices secured. When there is a positive base leakage rate, only water flow above the base leakage rate will be considered by the MPU 31 or server 14 for the purposes of sending an alert to the user. The base leakage rate would still be included in the water consumption data collected by the MPU 31. The user may either repair the leaks in the system or set the base leakage rate as such in the system 46.

The user must next calibrate 47 the main unit 11 to the specific water meter that it has been installed. While most water meters are similar in design, there are differences in the frequency of the magnetic variations produced by different brands and models of water meters based on the size and number of rotating magnets contained inside. Based on the particular water meter being used, the main unit 11 must be calibrated to correlate a certain change in magnetic field to a specific volume of water having passed through the water meter.

The final portion of the installation sequence is to select the response preferences of the system 48 which set the parameters for sending alerts to the user, select the medium or mediums that the alerts are sent and set the shut off parameters for the system. The user may rely on default response preferences or program customized response preferences based on their personal preferences and/or the characteristics of their particular water system. The response profiles may include a default, home, home away, away away (vacation) modes as well as a summer or winter option.

Figure 4:
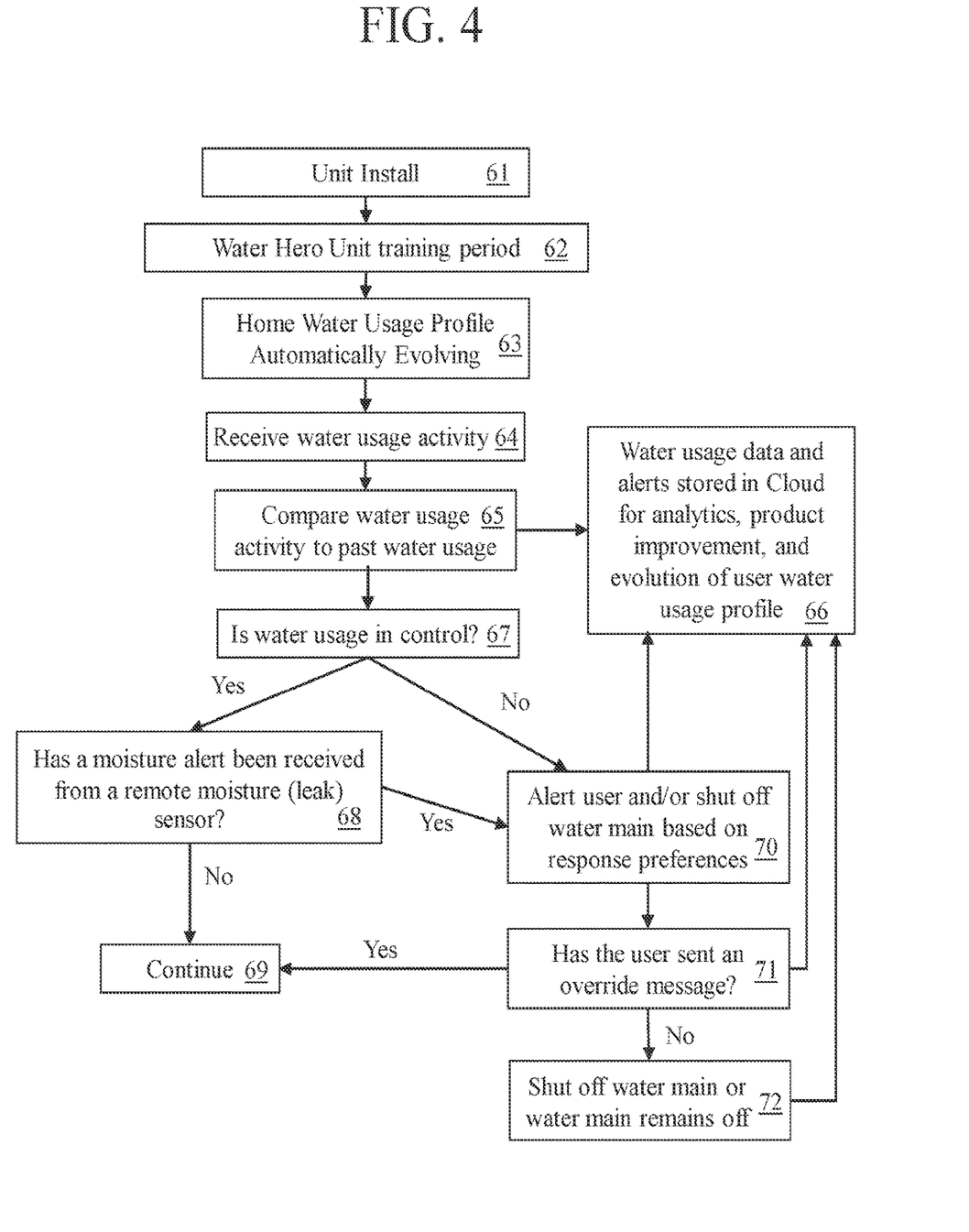
FIG. 4 is a flow chart for the operation of the first embodiment of the invention.

In FIG. 4 is a method of operating the water management system 10. The method of operation learns the water usage of the particular location and responds to the user based on the chosen response preferences selected. Once installation is complete, the server 14 maintains a home water usage profile for the account which is comprised of sensor data, alerts and user overrides.

Once the water management system 10 is installed 61 using the method shown in FIG. 3, the water management system 10 enters a training period 62 where it compiles the data needed to create a home water usage profile. The home water usage profile is created on the server 14 for each main unit 11 installed. The MPU 31 uploads water usage and sensor data to the server 14 through the communication network 13. As part of the home water usage profile, the server 14 also records instances when an alert is sent to the user in accordance with the selected response profile and if the user responds with an override message. The alert and override events can be used to fine tune the home water usage profile to reduce the occurrence of false positives.

After the training period 62 is complete, the home water usage profile continues to automatically evolve 63 as additional data is stored and analyzed by the server 14. Based on the long-term water consumption patterns of a household, the home water usage profile can create an accurate normal pattern of consumption to better identify which events are not normal for that system. The server 14 continues to receive water usage activity 64 and compares the water usage activity to past water usage 65 stored in the home water usage profile. All water usage data and alerts are stored on the server 14 for the automatic evolution of the home water usage profile, analytics and product improvement 66.

Figure 5:
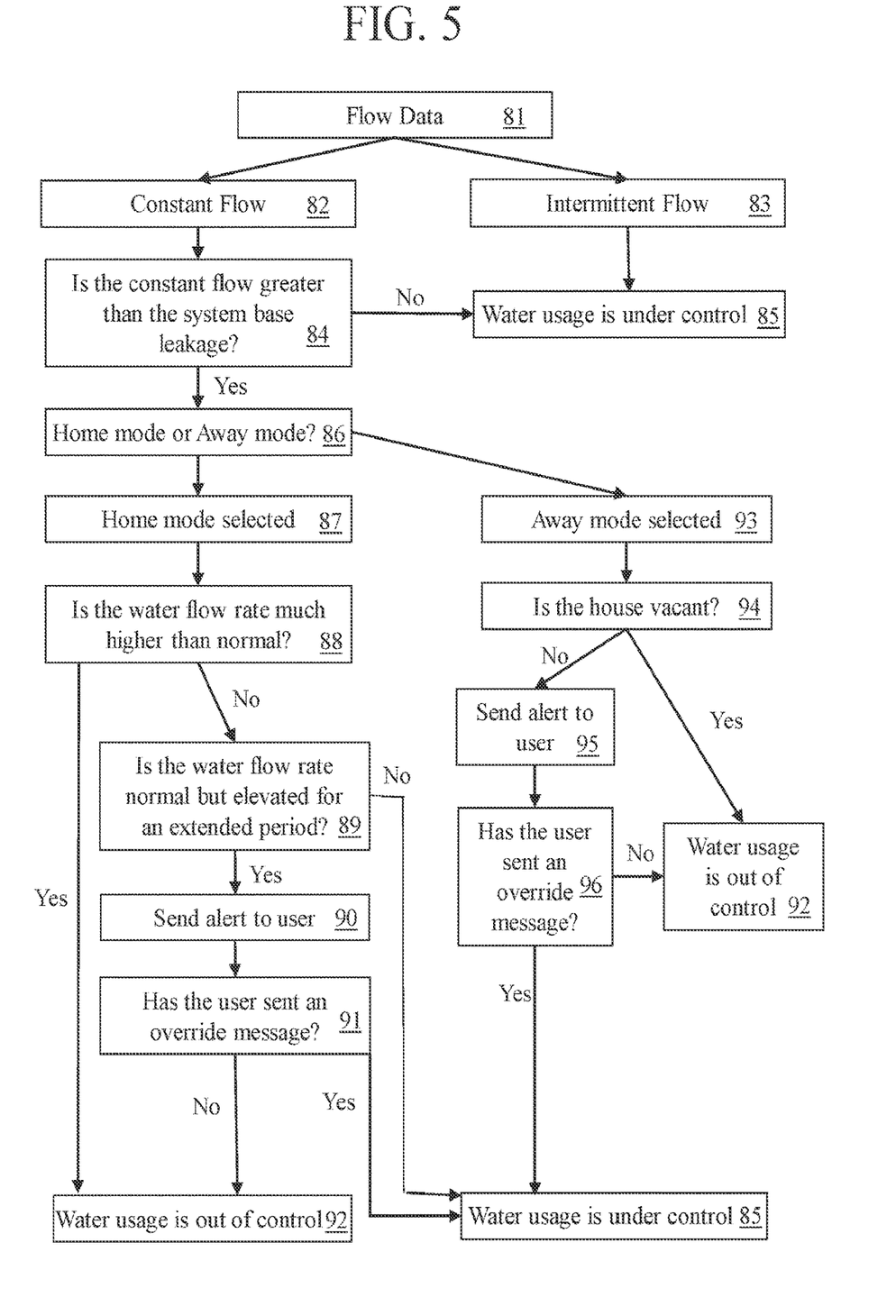
FIG. 5 is a flow chart for characterizing the flow rate.

By comparing the current water usage activity to the past water usage in step 65, the system 10 makes a determination whether the water usage is in control 67. This determination is based on factors that include the response profile selected by the user, the past water usage, the season, and the user's past override activity in response to past alerts. A flow chart showing the steps considered generally by the server in determining if the water usage is in control is shown in FIG. 5.

If the server 14 determines that the water usage is in control in step 67, the system checks to see if a moisture alert has been received from a remote moisture sensor 68. The remote moisture sensors are placed in high risk areas that are prone to water leaks, such as near water heaters, under washing machines or dishwashers and pipes prone to freezing. If no alert has been received from a moisture sensor, then the water continues to flow 69.

If the system 10 determines that the water usage is not in control in step 67, the system alerts the user and/or shuts off the water main depending on the response preferences selected by the user 70. If the system 10 determines that the water usage is in control in step 67, but an alert from a moisture sensor has been received in step 68, the system likewise alerts the user and/or shuts off the water main depending on the response preferences selected in step 70. All alert and water main shut down procedures carried out in step 70 are sent to the server 14 to be stored for analytics, product improvement and evolution of the user water usage profile 66.

Once an alert has been sent to the user in step 70, the user has the option of sending out an override message in step 71. If the user sends an override message in step 71, the system turns the water main back on (if it had been shut off in step 70) and the water continues to flow 69. The override message can create a temporary or permanent override of the system's response to a particular water consumption profile depending on the response profile selected by the user. The override message can be sent either through an internet enabled device, a phone call using a touch tone phone, a text message or through the water communication system. If the user fails to send an override message, the water main is shut off if not already shut off and it remains off 72 until positive action is taken by the user to turn the water back on.

In FIG. 5 is a flow chart showing how the server 14 determines when the water usage is under control 85 or out of control 92. The definition of "out of control" is a variable point that depends on the flow rate, amount of time that has elapsed and whether the home is occupied or not. In general, water flows that are constant over a period of time indicate a leak or break in the water supply system. Higher flow rates are more likely to cause damage quickly and are indicative of a major failure in the system. Lower flow rates may be normal over short periods of time, but can indicate a leak over a long period of time. Therefore, the system 10 is more sensitive to higher flow rates and classifies high flow rate events as out of control in a shorter amount of time than low flow rate events.

The server 14 collects the water flow data 81 from the MPU 31 and the system 10 determines whether there is constant flow 82 or intermittent flow 83. Intermittent flow 83 is characteristic of normal water usage where a person or appliance is using an amount of water and shutting off the water flow. Examples include a toilet refilling its tank, an ice maker consuming water to make ice or a dishwasher filling with water at the beginning of a cycle. Where water usage is only intermittent, the water usage is considered under control 85.

Constant flow 82 can be due to either the base leakage rate or an open water fitting. In systems with a base leakage rate of greater than zero, the constant flow 82 that the system is concerned with is any constant flow in excess of the base leakage rate. When the user sets a base leakage rate for the system, this rate of water loss is considered normal for the system. Therefore, only water escaping at a constant rate above the base leakage rate will cause the system to consider step 86.

Where a constant flow greater than the base leakage rate is determined by the system 10, the system then determines whether the user has selected the home mode 87 or away mode 86. If the user selected the home mode 87, the server next characterizes the water flow based on the rate of flow and the time that the constant flow has occurred.

Figure 6:
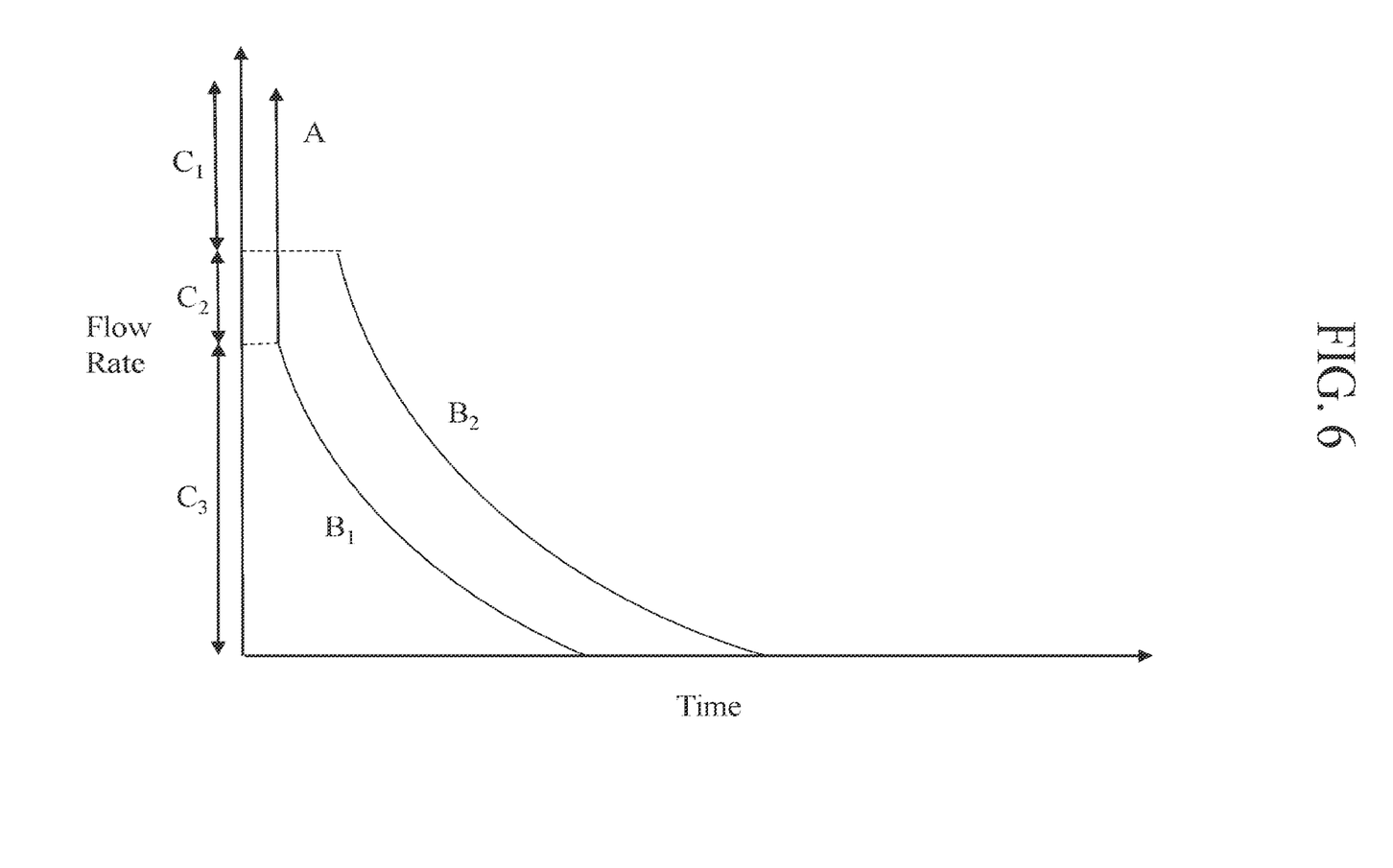
FIG. 6 is a graph of the user alert profile.

In FIG. 6 is a chart showing the relationship between the flow rate and the time elapsed for determining which response is appropriate in the response profile. Range C1 is characterized by a high flow rate over a short period of time. An example of water flow that would fall under C1 is a catastrophic failure of a pipe or fitting causing a rapid release of water. When the flow rate over time falls on line A, within range C1, the water main is shut down immediately and an alert is simultaneously or subsequently sent to the user. Line A begins at the dotted line marking the separation between range C1 and range C2. Range C2 is characterized by a higher than normal flow rate over a short period of time. Examples that would fall under C2 are watering a large lawn or filling a swimming pool. When the flow rate over time on line B1 falls within range C2, an alert is sent to the user immediately. Line B1 begins at the x axis and continues to the dotted line marking the separation between range C1 and range C2. Range C3 is characterized by a lower flow rate over a longer period of time. Examples of water flow that would fall under C3 are a faucet being left on or a slow leak in a pipe or fitting. When the flow rate over time falls on line B1 within range C3, the user is alerted only after the flow rate and time reach line B1.

Where line B1 represents the relationship between the flow rate and time when an alert is sent to the user, line B2 represents the point where the water main will be shut down if no response if received from the user. Lines A, B1 and B2 and ranges C1, C2 and C3 are depicted generally in FIG. 6 to show the relationship between flow rate and time for initiating alerts and a shutdown of the water main. Specific values for the flow rate and time were not given because these basic curves will shift based on the response preferences selected by the user. For example, the lines A, B1 and B2 would shift to the right in the summer to reflect the higher amount of water used to water plants or wash a vehicle. Depending on the user's personal preferences, the ranges C1, C2 and C3 can be adjusted either up to decrease the sensitivity of the system or down to increase the system's sensitivity to changes in constant water consumption.

In FIG. 5, when the home mode is selected in step 87, the system then determines if the water flow rate is much higher than normal 88. Flow rates considered much higher than normal would fall within ranges C1 and C2 on FIG. 6. When the flow rate is much higher than normal, the system characterizes the water usage as out of control 92. When the flow rate is not much higher than normal, the system then determines if the water flow rate is normal but elevated for an extended period of time 89. Flow rates that are normal but elevated for an extended period of time would fall under range C3 on FIG. 6. If the flow rate is not elevated for an extended period of time in step 89, then the water usage is normal and the water usage is classified as under control 85. With a normal but elevated flow rate over an extended period of time in step 89, the system sends an alert to the user 90 and gives the user a period of time to send an override message 91. Only when the user does not send an override message in the requisite amount of time is the water flow classified as out of control 92.

When the away mode is selected 93, the system checks to see if the house is actually vacant. This check can be completed analyzing the current water usage data to see if there is constant and intermittent flow, checking the user's location through a smart phone based GPS unit, using motion sensors within the home or tying into a home security system. If the system believes that the home is not vacant and the selection of the away mode was in error, the system sends the user an alert 95 with an opportunity for a user override. Only if the user does not send an override message 96 will the water usage be considered out of control 92. If the house is actually vacant, then any constant flow would be cause for concern and the system would classify the water flow as out of control 92.

To reduce the occurrence of false positives and false negatives in the determination of under control and out of control, the system 10 can optionally increase its sensitivity in the winter months, during low temperatures or when the pipes are cold. The system 10 can also leverage a user's smart phone GPS to determine whether the home or away mode is appropriate. While the system identifies various types of constant flow as out of control, there are some intermittent flow situations that can indicate a problem. For example, a leaking toilet valve would cause the toilet tank to refill each time the water level in the tank fell. While this is an intermittent flow, the system 10 can include algorithms to identify these types of intermittent flows as problematic and send the user an alert. The system 10 can also include preemptive overrides by the user for anticipated high flow or low flow events that fall within a set of predefined parameters.

Figure 7:
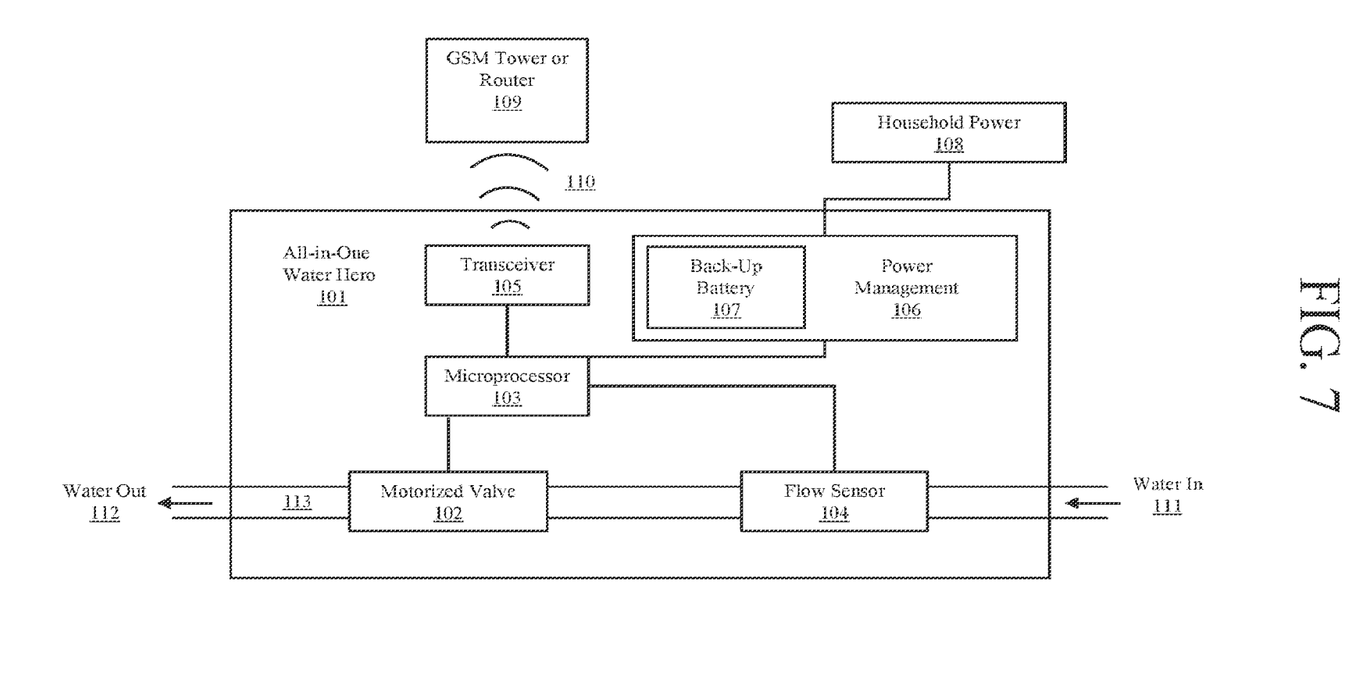
FIG. 7 is a block diagram of a second embodiment of the invention.

In FIG. 7 is a second embodiment of the invention, also using the methods disclosed in the flow charts of FIGS. 3-5 and the alert profile of FIG. 6. In the second embodiment is a single housing 101 containing at least a motorized valve 102, a microprocessor 103, a flow sensor 104, a transceiver 105, a power management unit 106 and a pipe 113.

The pipe 113 extends through the housing 101 to allow water to enter at a first end 111 and exit out of a second end 112. The first end 111 would normally be connected to the water supply pipe supplying water to a building. The second end 112 would normally be connected to the water supply system of the same building. Flow sensor 104 and motorized valve 102 are mounted to pipe 113 so that water entering from the first end 111 must pass through or past each prior to exiting through the second end 112. While water is capable of exiting the housing 101 through the second end 112, water flow may be stopped by motorized valve 102 in certain modes of operation.

Inside housing 101, microprocessor 103 is electrically connected to motorized valve 102, flow sensor 104, transceiver 105 and power management 106. Microprocessor 103 has a similar function to the MPU 31 in the first embodiment. In the second embodiment, the microprocessor 103 receives power from the power management unit 106 and receives data from flow sensor 104. Microprocessor 103 is also in two-way communication with motorized valve 102 and transceiver 105.

The flow sensor 104 transmits flow rate data to the microprocessor 103. Using the methods described in FIGS. 3-5, the microprocessor 103 is capable of directing the motorized valve 102 to stop the flow of water through pipe 113 so that water can enter through the first end 111 but not exit through the second end 112. The motorized valve 102 transmits data relating to the position of the motorized valve to the microprocessor 103. The motorized valve 102 is optimally a ball valve coupled to an electric motor that allows at least an open position allowing water to freely flow from the first end 111 of pipe 113 and out the second end 112 and a closed position that does not allow water to flow from the first end of pipe 113 and out the second end 112. Any position between the open position and closed position would allow a restricted amount of water to flow from the first end 111 of pipe 113 and out the second end 112. The position data that motorized valve 102 transmits to the microprocessor includes whether the ball valve is in the open position, the closed position or in a position between the two. While the present invention uses a ball valve, it is appreciated that other types of valves are suitable for the application.

Microprocessor 103 is in two-way communication with transceiver 105 which, in turn, is in two-way communication with a Global System for Mobiles ("GSM") tower or router 109. Transceiver 105 is capable of two-way communication with the GSM tower or router 109 using wireless broadcast and receiver technology 110 appropriate for the specific target of the communication. The transceiver may optionally use a wired connection or be in communication with other types of wireless networks, such as a Code Division Multiple Access tower. By interfacing with the GSM tower or router 109, the microprocessor is capable of two-way communication with a user as described in FIGS. 3-5.

The power management unit 106 supplies electrical power to the microprocessor 103. The motorized valve 102, flow sensor 104 and transceiver 105 receive power from the microprocessor 103. The power management unit 106 connects to household power 108 through a power plug or a hardwired connection to the electrical grid. A back-up battery 107 is included in the power management unit 106 to allow uninterrupted power to the microprocessor 103 in the event of an interruption in the household power supply 108.

Figure 8:
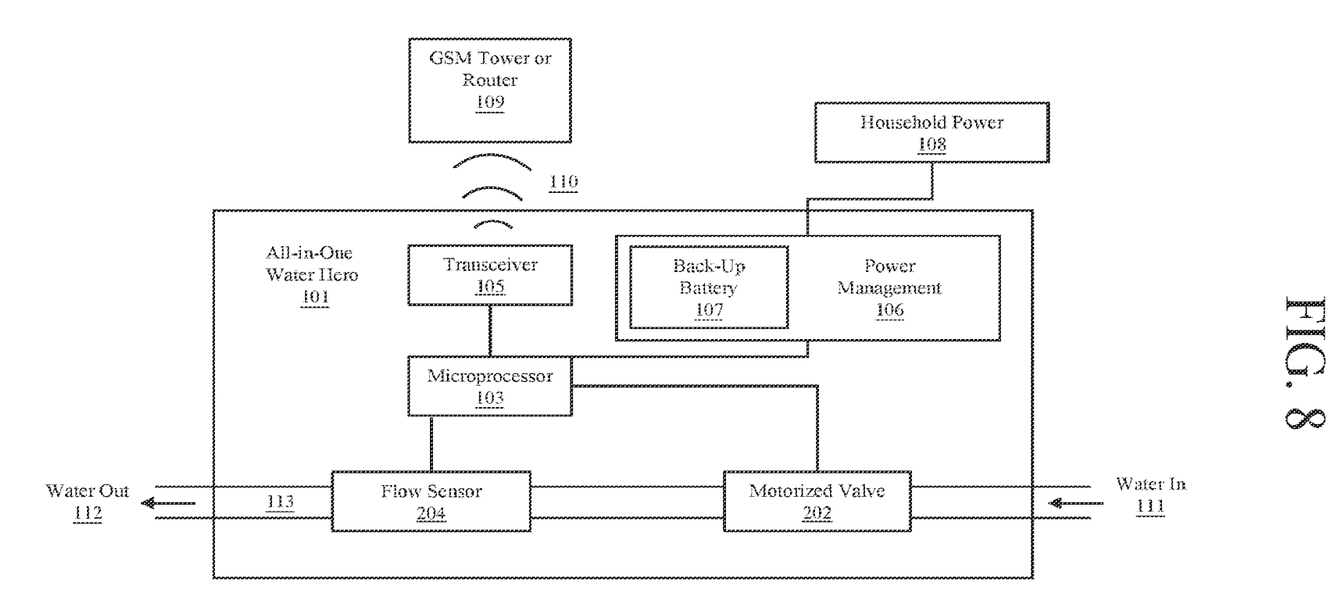
FIG. 8 is a block diagram of a third embodiment of the invention.

In FIG. 8 is a third embodiment of the invention, also using the methods disclosed in the flow charts of FIGS. 3-5 and the alert profile of FIG. 6. Elements in the third embodiment which are substantially the same as the corresponding elements of the second embodiment are identified with the same numeral. Elements which are similar (but not necessarily identical) in function are denoted by the same numeral plus 100.

The third embodiment is substantially similar to the second embodiment with the exception of the placement of the motorized valve 202 and the flow sensor 204 and software changes, if any, to accommodate the placement of the aforementioned. In the third embodiment, the motorized valve 202 is positioned closer to the first end 111 than the flow sensor 204. Microprocessor 103 is in two-way communication with the motorized valve 202 and receives data from the flow sensor 204.

Flow sensor 204 transmits flow rate data to the microprocessor 103. Using the methods described in FIGS. 3-5, the microprocessor 103 is capable of directing the motorized valve 202 to stop the flow of water through pipe 113 so that water can enter through the first end 111 but not exit through the second end 112. The motorized valve 202 transmits data relating to the position of the motorized valve to the microprocessor 103. The motorized valve 202 is optimally a ball valve coupled to an electric motor that allows at least an open position allowing water to freely flow from the first end 111 of pipe 113 and out the second end 112 and a closed position that does not allow water to flow from the first end of pipe 113 and out the second end 112. Any position between the open position and closed position would allow a restricted amount of water to flow from the first end 111 of pipe 113 and out the second end 112. The position data that motorized valve 202 transmits to the microprocessor includes whether the ball valve is in the open position, the closed position or in a position between the two. While the present invention uses a ball valve, it is appreciated that other types of valves are suitable for the application.

What has been described are systems and methods for the management and analysis of a water supply system in a residential or commercial property. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

The invention claimed is:

1. A system comprising: a water flow sensor configured to determine the flow rate of water in a pipe, where said water flow sensor is a magnetometer configured to receive water consumption data from a water meter; a motorized water valve mounted to said pipe; a main computing unit configured to receive water consumption data from said water flow sensor, configured to control said motorized valve and in two way communication with a user through a communication system; a computer server in two way communication with said user and said main computing unit where said server hosts an interface for communicating with said user; one or more vibration sensors mounted on a water supply pipe downstream of said water flow sensor and in communication with said main computing unit; one or more acceleration sensors mounted on a water valve downstream of said water flow sensor and in communication with said main computing unit; and where said communication system further comprises a method of communication with said user where said main computing unit directs said motor to restrict water flow in the system in a preset sequence to determine flow rate or leakage condition on a water supply pipe system.

2. The system of claim 1, wherein said communication system further comprises a method of communication with said main computing unit where said user turns on a water valve downstream of said water flow sensor in a preset sequence where the change in water flow is detected by said magnetometer.

3. Method comprising: attaching a water flow sensor with an identifier to a water meter; registering said identifier with a computer server; establishing communication between said water flow sensor and said computer server; setting a system base leakage on said computer server; and setting alert thresholds on said computer server based on the water flow rate above the base leakage rate and elapsed time of a water flow event on a water supply system.

4. The method of claim 3, wherein said method further comprises:
    establishing a continuously evolving water usage profile on said computer server based on past data collected by said water flow sensor and instances where said alert thresholds were exceeded; and
    said computer server comparing a current water flow rate to said water usage profile and characterizing said current water flow rate as in control or out of control and sending alerts where said current water flow rate exceeds said alert thresholds.

5. The method of claim 4, wherein said computer server provides an interface where said user can view information and metrics derived from said water usage profile and where a user can set said alert thresholds.

6. The method of claim 5, wherein said method further comprises:
    receiving time data from one or more acceleration sensors mounted on a water valve handle downstream of said water flow sensing sensor; and
    characterizing a water activity based on pattern matching from a quantity of water detected by said water flow sensing sensor and time data from one or more said acceleration sensors.

7. The method of claim 6, wherein said method further comprises:
    providing an interactive interface to a user to convey at least the water usage data collected from said water flow sensing sensor and for said user to input alert thresholds based on said water usage data;
    producing a continuously evolving water usage profile based on past water usage data received from at least said water flow sensing sensor;
    comparing current water flow sensing sensor data to said water usage profile; and
    alerting said user where said current water flow sensing sensor data exceeds said alert thresholds.

8. A non-transitory computer readable medium comprising instruction, the instructions being executable by a processor to perform a method, the method comprising: receiving water usage data from a water flow sensing sensor; receiving an identifier associated with said water flow sensing sensor; receiving time data from one or more activity sensors mounted to a water pipe or water pipe fitting downstream from said water flow sensing sensor; and characterizing a water activity based on pattern matching from the quantity of water detected by said water flow sensing sensor and time data from one or more said activity sensors and establishing communication between said water flow sensor and said computer server; setting a system base leakage on said computer server; and setting alert thresholds on said computer server based on the water flow rate above the base leakage rate and elapsed time of a water flow event on a water supply system.

9. The non-transitory computer readable medium of claim 8 wherein said activity sensors are comprised of one or more vibration sensors.

10. The non-transitory computer readable medium of claim 9 wherein said activity sensors further comprise one or more acceleration sensors.

11. The non-transitory computer readable medium of claim 8 wherein said activity sensors further comprise one or more ultrasonic transmitters.

12. The non-transitory computer readable medium of claim 11 wherein said one or more ultrasonic transmitters are mounted within the flow of water downstream of said water flow sensing sensor and are further comprised of baffles or restrictions to the flow of water inside the pipe that are capable of generating a sound.

13. The non-transitory computer readable medium of claim 12 wherein the sound generated by said one or more ultrasonic transmitters is transmitted using the pipes of a plumbing system as a conduit for the sound to travel.

14. The non-transitory computer readable medium of claim 13; the instructions further comprising receiving sound data generated by said one or more ultrasonic transmitters.

15. The non-transitory computer readable medium of claim 14 further comprising two or more ultrasonic transmitters mounted within the flow of water downstream of said water flow sensing sensor, each ultrasonic transmitter capable of producing a different sound and a means of sensing and differentiating between the different sounds produced by each ultrasonic transmitter.

* * * * *